(12) United States Patent
Hultberg et al.

(10) Patent No.: US 10,614,441 B2
(45) Date of Patent: *Apr. 7, 2020

(54) METHODS FOR SECURE TRANSACTIONS

(71) Applicant: ACCUMULATE AB, Stockholm (SE)

(72) Inventors: Stefan Hultberg, Bromma (SE); Magnus Westling, Saltsjö-boo (SE)

(73) Assignee: Accumulate AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,657

(22) Filed: Apr. 5, 2019

(65) Prior Publication Data
US 2019/0236578 A1 Aug. 1, 2019

Related U.S. Application Data

(63) Continuation of application No. 15/985,815, filed on May 22, 2018, now Pat. No. 10,296,893, which is a continuation of application No. 15/714,474, filed on Sep. 25, 2017, now Pat. No. 10,002,350, which is a continuation of application No. 12/742,135, filed as application No. PCT/SE2008/051403 on Dec. 4, 2008, now Pat. No. 9,773,239.

(30) Foreign Application Priority Data

Dec. 4, 2007 (SE) ...................... 0702686

(51) Int. Cl.
  *G06Q 20/10* (2012.01)
  *G06Q 20/32* (2012.01)
  *G06Q 20/34* (2012.01)
  *G06Q 20/38* (2012.01)

(52) U.S. Cl.
  CPC ......... *G06Q 20/322* (2013.01); *G06Q 20/108* (2013.01); *G06Q 20/32* (2013.01); *G06Q 20/3552* (2013.01); *G06Q 20/3823* (2013.01)

(58) Field of Classification Search
  None
  See application file for complete search history.

(56) References Cited

U.S. PATENT DOCUMENTS 3,573,731 A * 4/1971 Schwend ............. G06Q 20/347
                                                        235/380
4,578,530 A * 3/1986 Zeidler .................. G06Q 20/02
                                                        380/277

(Continued)

FOREIGN PATENT DOCUMENTS

CA       2361489 A1    8/2000
EP       0813325 A2    12/1997

(Continued)

OTHER PUBLICATIONS

Credit Cards: Use and Consumer Attitudes by Durkin (Durkin) (Year: 2000).*

(Continued)

*Primary Examiner* — Chikaodinaka Ojiaku
(74) *Attorney, Agent, or Firm* — Perkins Coie LLP

(57) ABSTRACT

The present invention relates to a method for a secure transaction utilizing a portable radio communication device (10), wherein both parts in the secure transaction are protected against fraudulent actions, among other things by use of a common transaction identity on a predefined transaction server.

3 Claims, 2 Drawing Sheets

(56) References Cited

U.S. PATENT DOCUMENTS

| | | | | |
|---|---|---|---|---|
| 5,590,038 | A * | 12/1996 | Pitroda | G06Q 20/02 705/41 |
| 5,884,271 | A * | 3/1999 | Pitroda | G06Q 20/02 705/2 |
| 6,226,752 | B1 | 5/2001 | Gupta et al. | |
| 6,480,957 | B1 * | 11/2002 | Liao | H04L 9/3273 380/277 |
| 6,591,249 | B2 | 7/2003 | Zoka | |
| 6,622,017 | B1 * | 9/2003 | Hoffman | G06F 8/65 455/412.1 |
| 6,705,520 | B1 * | 3/2004 | Pitroda | G06K 7/0013 235/380 |
| 6,769,607 | B1 * | 8/2004 | Pitroda | G06K 7/0013 235/380 |
| 6,810,245 | B1 * | 10/2004 | Hinds | G06F 8/60 455/418 |
| 6,889,325 | B1 * | 5/2005 | Sipman | G06Q 20/04 380/268 |
| 7,047,041 | B2 * | 5/2006 | Vanska | G06Q 30/0222 455/403 |
| 7,110,754 | B2 * | 9/2006 | Inagaki | H04W 4/029 455/419 |
| 7,184,759 | B2 * | 2/2007 | Date | G06F 9/4411 455/352 |
| 7,200,390 | B1 * | 4/2007 | Henager | H04W 8/245 455/412.1 |
| 7,248,895 | B2 * | 7/2007 | Shiraogawa | H04W 8/265 455/419 |
| 7,266,369 | B2 * | 9/2007 | Moles | H04M 3/42178 455/414.1 |
| 7,274,909 | B2 * | 9/2007 | Perttila | G01S 13/751 455/41.2 |
| 7,526,762 | B1 * | 4/2009 | Astala | G06F 8/33 709/203 |
| 7,539,156 | B2 * | 5/2009 | Leung | H04W 92/18 370/313 |
| 7,565,141 | B2 * | 7/2009 | Macaluso | H04M 1/72525 379/201.01 |
| 7,603,109 | B2 * | 10/2009 | Barone | H04W 4/00 455/414.1 |
| 7,603,119 | B1 * | 10/2009 | Durig | H04W 48/16 455/419 |
| 7,603,406 | B2 * | 10/2009 | Gulliver | G06Q 20/346 709/202 |
| 7,689,497 | B2 * | 3/2010 | May | G06Q 30/08 705/36 R |
| 7,702,329 | B1 * | 4/2010 | Durig | H04W 8/183 455/432.1 |
| 7,707,113 | B1 * | 4/2010 | DiMartino | G06Q 20/105 705/41 |
| 7,720,742 | B1 * | 5/2010 | Mauro | G06Q 40/00 705/37 |
| 7,725,103 | B2 * | 5/2010 | Boss | H04W 8/22 370/241 |
| 7,933,583 | B2 * | 4/2011 | Tarkkala | H04L 63/126 455/411 |
| 8,112,549 | B2 * | 2/2012 | Srinivasan | G06Q 10/107 707/621 |
| 8,234,694 | B2 * | 7/2012 | Youn | H04L 63/0846 713/156 |
| 8,244,892 | B2 * | 8/2012 | Carreel | H04W 8/245 709/230 |
| 8,255,090 | B2 * | 8/2012 | Frader-Thompson | G01D 4/002 700/295 |
| 8,306,505 | B2 * | 11/2012 | Bennett | H04W 8/205 455/411 |
| 8,473,570 | B2 * | 6/2013 | Barone | H04L 67/306 709/217 |
| 8,555,273 | B1 * | 10/2013 | Chia | G06F 8/654 717/173 |
| 8,578,361 | B2 * | 11/2013 | Cassapakis | G06F 8/654 717/168 |
| 8,645,002 | B2 * | 2/2014 | Gray | G06Q 20/102 455/419 |
| 8,725,114 | B2 * | 5/2014 | Syal | H04W 8/245 455/411 |
| 8,745,653 | B2 * | 6/2014 | Chen | H04L 67/16 455/418 |
| 8,893,110 | B2 * | 11/2014 | Kapadekar | G06F 8/65 717/171 |
| 9,185,234 | B2 * | 11/2015 | Horel | G06Q 20/16 |
| 9,232,077 | B2 * | 1/2016 | Yu | H04L 12/14 |
| 9,350,875 | B2 * | 5/2016 | Yu | G06Q 30/04 |
| 9,432,473 | B2 * | 8/2016 | Biollo | H04L 51/043 |
| 9,646,444 | B2 * | 5/2017 | Ortiz | G06Q 10/06 |
| 9,729,477 | B2 * | 8/2017 | Carey | H04L 51/04 |
| 2001/0018660 | A1 * | 8/2001 | Sehr | G06Q 10/02 705/5 |
| 2001/0025271 | A1 | 9/2001 | Allen | |
| 2002/0032649 | A1 | 3/2002 | Selvarajan | |
| 2002/0181710 | A1 | 12/2002 | Adam et al. | |
| 2003/0051173 | A1 * | 3/2003 | Krueger | G06F 21/32 726/21 |
| 2003/0061172 | A1 | 3/2003 | Robinson | |
| 2004/0006710 | A1 * | 1/2004 | Pollutro | G06F 21/31 726/28 |
| 2004/0107170 | A1 | 6/2004 | Labrou et al. | |
| 2004/0139320 | A1 * | 7/2004 | Shinohara | H04W 12/04 713/168 |
| 2004/0148252 | A1 | 7/2004 | Fleishman | |
| 2004/0030894 | A1 | 12/2004 | Labrou et al. | |
| 2005/0027543 | A1 * | 2/2005 | Labrou | G06Q 20/02 705/26.35 |
| 2005/0080678 | A1 | 4/2005 | Economy et al. | |
| 2005/0184145 | A1 | 8/2005 | Law et al. | |
| 2005/0187873 | A1 * | 8/2005 | Labrou | G06Q 20/02 705/40 |
| 2005/0227218 | A1 | 10/2005 | Mehta et al. | |
| 2005/0239447 | A1 * | 10/2005 | Holzman | H04L 63/08 455/414.3 |
| 2006/0026017 | A1 * | 2/2006 | Walker | G06Q 10/00 701/31.4 |
| 2006/0064391 | A1 * | 3/2006 | Petrov | G06Q 20/10 705/65 |
| 2006/0076400 | A1 | 4/2006 | Fletcher | |
| 2006/0196931 | A1 * | 9/2006 | Holtmanns | G06Q 20/3552 235/380 |
| 2006/0206709 | A1 * | 9/2006 | Labrou | G06Q 20/18 713/167 |
| 2006/0235761 | A1 | 10/2006 | Johnson | |
| 2007/0022058 | A1 | 1/2007 | Labrou et al. | |
| 2007/0130085 | A1 | 6/2007 | Zhu | |
| 2007/0174080 | A1 | 7/2007 | Outwater | |
| 2007/0255662 | A1 | 11/2007 | Tumminaro | |
| 2007/0282743 | A1 | 12/2007 | Lovelett et al. | |
| 2007/0294168 | A1 * | 12/2007 | King | G06Q 20/02 705/44 |
| 2008/0052091 | A1 * | 2/2008 | Vawter | G06Q 20/10 705/39 |
| 2008/0072226 | A1 * | 3/2008 | Armes | G06F 9/505 718/101 |
| 2008/0091614 | A1 * | 4/2008 | Bas Bayod | G06Q 20/04 705/71 |
| 2008/0103971 | A1 * | 5/2008 | Lukose | G06Q 20/10 705/40 |
| 2008/0103972 | A1 * | 5/2008 | Lanc | G06Q 20/32 705/44 |
| 2008/0154772 | A1 * | 6/2008 | Carlson | G06Q 20/04 705/44 |
| 2008/0208762 | A1 * | 8/2008 | Arthur | G06Q 20/027 705/79 |
| 2010/0078471 | A1 * | 4/2010 | Lin | G06Q 40/02 235/379 |

(56) References Cited

U.S. PATENT DOCUMENTS

| | | | | |
|---|---|---|---|---|
| 2010/0078472 | A1* | 4/2010 | Lin | G06Q 20/405 235/379 |
| 2010/0082448 | A1* | 4/2010 | Lin | G06F 21/10 705/26.1 |
| 2010/0082481 | A1* | 4/2010 | Lin | G06Q 20/042 705/41 |

FOREIGN PATENT DOCUMENTS

| | | |
|---|---|---|
| EP | 1772832 A1 | 4/2007 |
| EP | 2212842 A1 | 4/2010 |
| JP | 2000-242700 | 9/2000 |
| JP | 2002-063524 | 2/2002 |
| JP | 2002-109397 | 4/2002 |
| JP | 2002-133339 | 5/2002 |
| JP | 2002-133339 A | 5/2002 |
| JP | 2004-072777 | 3/2004 |
| JP | 2004-334664 | 11/2004 |
| WO | 2005101264 A2 | 10/2005 |
| WO | 2006078910 A2 | 7/2006 |

OTHER PUBLICATIONS

IEEE Transactions on Communications (vol. 29, Issue: 11, pp. 1684-1687) by Ingemarsson (Ingermarsson) (Year: 1981).*
Decision to refuse a European Patent application for European Patent Application No. 08857857.0, issued by European Patent Office dated Apr. 6, 2017. 18 pages.
Decision to refuse a European Patent application for European Patent Application No. 13198300.9, issued by European Patent Office dated Apr. 3, 2017. 15 pages.
Decision to refuse a European Patent application for European Patent Application No. 13191627.2, issued by European Patent Office dated Apr. 6, 2017. 20 pages.
Decision to refuse a European Patent application for European Patent Application No. 13191603.3, issued by European Patent Office dated Apr. 12, 2017. 19 pages.
Decision to refuse a European Patent application for European Patent Application No. 13191571.2, issued by European Patent Office dated Apr. 10, 2017. 16 pages.
Third Party Observation for European Patent Application No. EP20080857857, filed by Anonymous on Mar. 18, 2016. 10 pages.
Summons to attend oral proceedings pursuant to Rule 115(1) EPC for European Patent Application No. 08857857.0, issued by European Patent Office on Apr. 18, 2016. 17 pages.
Third Party Observation for European Patent Application No. EP20080857857,filed by Anonymous on Apr. 18, 2016. 19 pages.
Third Party Observation for European Patent Application No. EP20130175292, filed by Anonymous on Mar. 1, 2016. 12 pages.
Summons to attend oral proceedings pursuant to Rule 115(1) EPC for European Patent Application No. 13175292.5, issued by European Patent Office on Apr. 14, 2016. 12 pages.
Third Party Observation for European Patent Application No. EP20130191571, filed by Anonymous on Mar. 1, 2016. 10 pages.
Summons to attend oral proceedings pursuant to Rule 115(1) EPC for European Patent Application No. 13191571.2, issued by European Patent Office on Apr. 29, 2016. 13 pages.
Third Party Observation for European Patent Application No. EP20130191603, filed by Anonymous on Mar. 18, 2016. 37 pages.
Third Party Observation for European Patent Application No. EP20130191603, filed by Anonymous on Apr. 18, 2016. 19 pages.
Summons to attend oral proceedings pursuant to Rule 115(1) EPC for European Patent Application No. 13191603.3, issued by European Patent Office on Apr. 19, 2016. 13 pages.
Communication pursuant to Rule 114(2) EPC for European Patent Application No. 13191627.2, issued by European Patent Office on Mar. 31, 2016. 1 page.
Third Party Observation for European Patent Application No. EP20130191627 filed by Anonymous on Apr. 18, 2016. 19 pages.
Summons to attend oral proceedings pursuant to Rule 115(1) EPC for European Patent Application No. 13191627.2, issued by European Patent Office on Apr. 19, 2016. 12 pages.
Third Party Observation for European Patent Application No. EP20130198300, filed by Anonymous on Mar. 18, 2016. 49 pages.
Third Party Observation for European Patent Application No. EP20130198300 filed by Anonymous on Apr. 18, 2016. 19 pages.
Summons to attend oral proceedings pursuant to Rule 115(1) EPC for European Patent Application No. 13198300.9, issued by European Patent Office on Apr. 19, 2016. 12 pages.
Opposition Writ from Opponent, Feb. 29, 2016. 64 pages.
Third Party Observations for European Application No. 13175292. 5, dated Nov. 24, 2014. 4 pages.
Office Action issued by the European Patent Office in European Patent Application No. 13175292.5 dated Dec. 4, 2014. 13 pages.
Office Action issued by the European Patent Office in European Patent Application No. 13175297.4 dated Dec. 4, 2014. 13 pages.
Office Action issued by the European Patent Office in European Patent Application No. 13191571.2 dated Dec. 4, 2014. 13 pages.
Translation of Office Action issued by the Korean Intellectual Property Office in Korean Patent Application No. 10-2010-7010611. 2 pages.
Third Party Observations for European Application No. 13191571. 2, dated May 15, 2014. 5 pages.
Chinese Office Action issued for CN Application No. 200880116263.1 dated Feb. 11, 2014. 11 pages.
European Office Action issued for EP Application No. 08 857 857.0 dated Feb. 17, 2014. 13 pages.
European Office Action issued for EP Application No. 13 198 300.9 dated Mar. 24, 2014. 24 pages.
European Office Action issued for EP Application No. 13 191 603.3 dated Mar. 24, 2014. 25 pages.
European Office Action issued for EP Application No. 13 191 627.2 dated Mar. 24, 2014. 23 pages.
European Search Report issued for EP Application No. 13191571.2 dated Feb. 17, 2014. 4 pages.
European Search Report issued for EP Application No. 13191603.3 dated Feb. 18, 2014. 4 pages.
European Search Report issued for EP Application No. 13191627.2 dated Feb. 18, 2014. 4 pages.
European Search Report issued for EP Application No. 13198300.9 dated Feb. 18, 2014. 4 pages.
Extended European Search Report issued for EP Application No. 13175292.5 dated Feb. 19, 2014. 27 pages.
Extended European Search Report issued for EP Application No. 13175297.4 dated Feb. 19, 2014. 26 pages.
Mexican Office Action issued for MX Application No. MX/a/2010/006193 dated Mar. 5, 2014. 3 pages.
Third Party Observation for application No. EP 20130175292 dated Jan. 17, 2014. 3 pages.
Third Party Observation for application No. EP 20130175297 dated Jan. 17, 2014. 3 pages.
Translation of Office Action issued for Egyptian Patent Application No. 2010060941 dated Mar. 19, 2014. 4 pages.
Notification of Reasons for Rejection, Japanese Patent Application No. 2010-536890, dated Jun. 18, 2013, 3 pages.
Office Action for Chinese Patent Application No. 200880116263.1, dated Jul. 1, 2013, 2 pages.
Office Action for Egyptian Patent Application No. 2010060941, dated Aug. 5, 2013, 23 pages.
International Application No. PCT/SE2008/081403, Preliminary report on Patentability dated May 10, 2009, 5 pages.
Office Action issued by the European Patent Office in European Patent Application No. 08 857 857.0 dated May 8, 2015. 15 pages.
Office Action issued by the European Patent Office in European Patent Application No. 13 198 300.9 dated May 8, 2015. 13 pages.
Office Action issued by the European Patent Office in European Patent Application No. 13 191 627.2 dated May 8, 2015. 12 pages.
Office Action issued by the European Patent Office in European Patent Application No. 13 191 603.3 dated May 8, 2015. 10 pages.
Third Party Observations for European Application No. 13 198 300.9, dated Mar. 26, 2015. 4 pages.

(56) References Cited

OTHER PUBLICATIONS

Third Party Observations for European Application No. 13191627.2, dated Mar. 26, 2015. 4 pages.
Third Party Observations for European Application No. 13191603.3, dated Mar. 26, 2015. 4 pages.
Third Party Observations for European Application No. 08857857.0, dated Feb. 23, 2015. 5 pages.
Xiong, Li; "Reputation and Trust" Chapter II of *Advances in Security and Payment Methods for Mobile Commerce*. 2005. 17 pages.
Xiong, Li; "Mobile Commerce Security and Payment Methods" Chapter I of *Advances in Security and Payment Methods for Mobile Commerce*. 2005. 20 pages.
Press release entitled "Tyska paybox lanserar snabb, anvandarvanlig och saker tjanst for betaining via mobiltelefoner", dated Nov. 27, 2000, 5 pages.
Indian Application No. 3345/CHENP/2010, Examination Report issued dated Jan. 29, 2018, 6 pages.
Swedish Application No. 1050585-7, Office Action dated Feb. 19, 2018, 13 pages.
Extended European Search Report for EP Application No. 10783654.6, dated Mar. 20, 2014, 6 pages.
Durkin, "Credit Cards: Use and Consumer Attitudes, 1970-2000", *Federal Reserve Bulletin*, Sep. 2000, 12 pages.
ETSI TS 102 204 V1.1.4 (Aug. 2003), "Mobile Commerce (M-COMM); Mobile Signature Service; Web Service Interface," Technical Specification, ETSI, Sophia Antipolis, France, 65 pages.(Aug. 28, 2008).

\* cited by examiner

METHODS FOR SECURE TRANSACTIONS

RELATED APPLICATIONS

This application is a continuation of U.S. patent application Ser. No. 15/985,815, filed May 22, 2018, which is a continuation of U.S. application Ser. No. 15/714,474, entitled "METHODS FOR SECURE TRANSACTIONS," filed Sep. 25, 2017, (now U.S. Pat. No. 10,002,350) which is a continuation of U.S. application Ser. No. 12/742,135, entitled "METHOD FOR SECURE TRANSACTIONS," filed May 10, 2010, (now U.S. Pat. No. 9,773,239) which is a 35 USC § 371 National Stage application of International Application No. PCT/SE2008/051403, entitled "METHOD FOR SECURE TRANSACTIONS," filed on Dec. 4, 2008, which claims priority to Swedish Application No. 0702686-7, filed Dec. 4, 2007, the disclosures of which are incorporated herein by reference in their entireties for all purposes.

FIELD OF INVENTION

The present invention relates generally to transactions, and particularly to secure transactions utilizing a portable radio communication device, such as a mobile phone, personal digital assistant, portable computer or similar.

BACKGROUND

It is today common with transactions initiated and performed via e.g. Internet. Further, with mobile phones or similar devices it is today possible to perform transactions and related actions through data communication via wireless communication. This provides for a very neat way of performing secure transactions, by always having an electronic authentication device at hand, which could be used as a secure wallet/bank solution. However, this also provides for a variety of ways to manipulate the transaction systems in order to fraud one or both of the parts in a transaction.

SUMMARY OF THE INVENTION

An object of the present invention is thus to provide secure transactions for portable radio communication devices.

This object, among others, is according to the present invention attained by a method as defined by the appended claims.

By providing a method for secure transactions wherein both parts in a transaction are connected to a predefined transaction server and independently approves the transaction a secure transaction is achieved.

Preferably, the transaction identity is kept unique only during a specific transaction, whereby the necessary amount of transaction identities can be kept very low at the transaction server, being limiting only for handling parallel transactions at the transaction server.

The unique transaction identity is preferably created by the transaction server upon request from the first transaction part, which provides for an assured solution for the first transaction part. Alternatively, the transaction identity is created by the second transaction part, which facilitates the transaction for the first transaction part. Further, for e.g. Internet bank login a predefined transaction identity is preferably used.

The verification is preferably performed by entering a personal identification number (PIN) in the portable radio communication device, which PIN is selected during installation of user transaction software.

Further features and advantages of the present invention will be evident from the following description.

BRIEF DESCRIPTION OF THE DRAWINGS

The present invention will become more fully understood from the detailed description of embodiments given below and the accompanying figures, which are given by way of illustration only, and thus, are not limitative of the present invention, wherein.

DETAILED DESCRIPTION OF EMBODIMENTS

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

Figure 1:
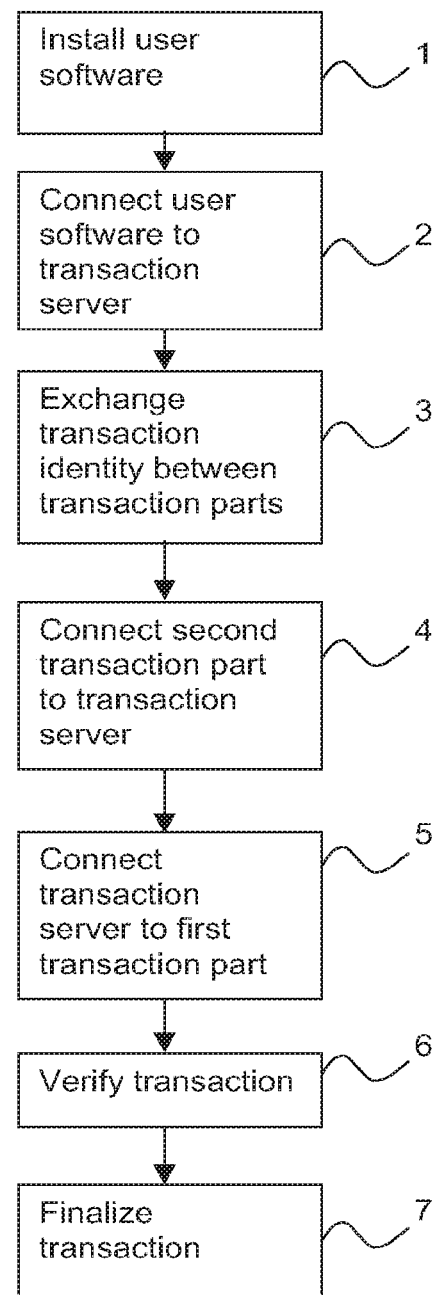
FIG. 1 schematically shows the steps of a method for secure transactions according to an embodiment of the present invention.
Figure 2:
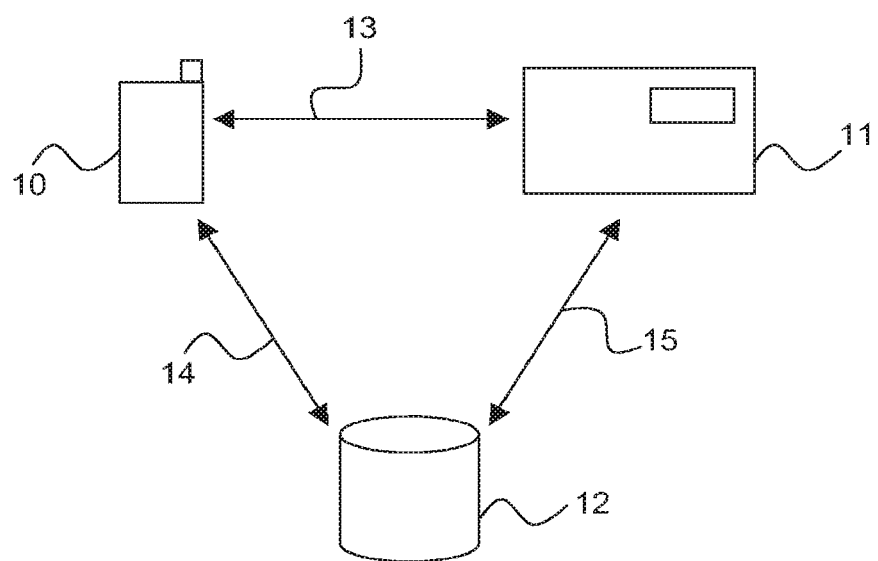
FIG. 2 schematically shows communication between transaction parts according to an embodiment of the present invention.

An embodiment of the present invention will now be described with reference to FIGS. 1 and 2.

In order to secure all links of a transaction, the first step is to install 1 a user transaction software in a portable communication device 10 of a first transaction part in a secure way, wherein a user is identified in a secure way and tied to the installation. One secure way is to, at e.g. a bank office or other known part, install the user transaction software in the portable radio communication device of the first transaction part or give a memory card or similar device having an installation program for the first transaction part thereon. The identity of the owner of the portable radio communication device is checked in connection with the installation or delivery of the user transaction software transaction program. Instead of checking the identity directly at a bank office or other known part e.g. a registered letter sent to the intended user can be used to verify the identity of the intended user. Finally the user transaction software is connected to an account at the bank or other part, such as a credit card account, a user account, an electronic wallet, etc. Another secure way to install the user transaction software is to, at e.g. an authenticated Internet bank office or similar part, through a secure connection, e.g. a https connection, install the user transaction software in the portable radio communication device of the first transaction part. The identity of the owner of the portable radio communication device is checked in connection with the installation through e.g. PIN. Finally the user transaction software is connected to an account at the bank or other part, such as a credit card account, a user account, an electronic wallet, etc.

The user transaction software is arranged to communicate with a predefined transaction server 12 when secure transactions are performed. Information of which account a user transaction software is connected to can be predefined directly at the transaction server or be accessed by the transaction server from the first transaction part whenever a transaction is to take place. Account balance and similar checks are preferably performed prior to any finalization of a transaction.

When a secure Internet installation is utilized a mobile phone number is preferably given to the distribution site, which in response thereto sends a text message, such as an SMS, with a download URL to that mobile phone number, i.e. a so called over the air installation (OTA installation). By following that link in the mobile phone the user transaction software is installed in the mobile phone. To first start the application run by the user transaction software an activation code, given by the distribution site, is entered.

Further, a PIN is also required to be entered to run the application.

When a transaction 13 is to take place, wherein the second transaction part is Internet based, such as an authenticated merchant secure Internet site 11 or a secure login, the transaction comprises the following steps. The user of the portable radio communication device, i.e. the first transaction part, selects a "transaction" section of the user transaction software to connect the first transaction part to the transaction server. The first transaction part 10 activates itself, through an encoded/encrypted wireless communication, on the transaction server 12, which transaction server 12 thereby puts the first transaction part 10 in an active transaction state on the transaction server 12.

The first transaction part 10 preferably stays in the active transaction state on the transaction server 12 until the first transaction part 10 requests a non-active transaction state. Alternatively, the first transaction part 10 will be put into a non-active transaction state by the transaction server 12 after a time-out. Further, the transaction server 12 could also put the first transaction part 10 in a non-active state after finalization of a transaction. By waiting for a request before putting the first transaction part into a non-active state the advantage is obtained that the user can perform several consecutive transactions without having to reselect the "transaction" section of the user transaction software. This is however preferably combined with a time out, which gives the advantage that the user does not forget to put the portable radio communication device in a non-active transaction state, which would be risky if another person gets hold of the portable radio communication device. From a secure perspective it would be advantageous to put the first transaction part in a non-active transaction state also after a transaction have been completed.

The first transaction part thereafter initiates the transaction by requesting 2, through an encoded/encrypted wireless communication, a transaction identity of the transaction server. The wireless communication can e.g. be performed through GPRS, 3G data, Wi-Fi or WiMAC, all of which could have some kind of built-in identity verification, and even infrared or Bluetooth, which however are anonymous and could require some added identity verification. The transaction server responds by sending 14 a transaction identity to the first transaction part, which transaction identity is unique during the whole transaction but is preferably reusable after finalization of the transaction, advantageously directly after finalization of the transaction, i.e. when the transaction receipt has been sent.

The first transaction part enters 3 the returned transaction identity at the merchant secure Internet site 11, i.e. the second transaction part 11. The second transaction part 11 activates itself on the transaction server 12, which transaction server 12 thereby puts the second transaction part 11 in an active transaction state on the transaction server 12. The second transaction part thereafter sends 4, 15 information of the transaction connected to the transaction identity to the transaction server 12, preferably encrypted. The activation and the following information of the transaction could also be performed in one action, such that the sending of information of the transaction to the transaction server also puts the second transaction part in an active transaction state on the transaction server. Transaction information from the second transaction part that is sent with a transaction can vary, but typically includes the name of the second transaction part and the transaction amount, and possibly also the product name, at a purchase. The name of the second transaction part could alternatively be extracted from the login of the second transaction part to the system instead of being sent together with the transaction, to ensure that such information is not distorted. This is usually performed via a landline, but could also be performed via wireless communication. The second transaction part has previously registered an account at the transaction server, in a way similarly performed for the first transaction part. Account information or similar information of the first transaction part is not necessary to give to the second transaction part and vice versa, since such information is known by the transaction server, and such information should thus not be given to the second transaction part and vice versa.

The transaction server 12 identifies the first transaction part by the unique transaction identity sent by the second transaction part and preferably requests 5, through an encoded/encrypted wireless communication, a verification by the first transaction part of the transaction information connected to the transaction identity. The user transaction software requests 6 e.g. a PIN as verification of the transaction information, such as name of the second transaction part and transaction amount. The verification is returned, through an encoded/encrypted wireless communication, to the transaction server connected to the transaction identity.

After verification from the first transaction part the transaction server finalizes 7 the transaction connected to the unique transaction identity and sends a transaction receipt to both the first transaction part, through an encoded/encrypted wireless communication, and the second transaction part. The transaction is only finalized provided that the accounts of both the first transaction part and the second transaction part accept the transaction.

The transaction has been described with a portable radio communication device as the first transaction part and a merchant as the second transaction part. The reverse is however also possible wherein the merchant requests a unique transaction identity of the transaction server, in this case preferably through a land line. The unique transaction identity is then communicated to the portable radio communication device from the merchant. However, information of the transaction connected to the unique transaction identity is again sent from merchant to the predefined transaction server, which, by wireless communication, sends the information of the transaction connected to the unique transaction identity to the portable radio communication device. The transaction connected to the unique transaction identity is still verified at the portable radio communication device by a user verification, which verification connected to the unique transaction identity is sent to the transaction server. The transaction connected to the unique transaction identity is thereafter finalized based on the information of the transaction and the unique transaction identity, and a transaction receipt of the finalized transaction is sent from the transaction server to the first and second transaction parts. Also in this reverse procedure both transaction parts have individually put themselves in an active transaction state on the transaction server. Without both transaction parts in the active transaction state the transaction will not be finalized.

A similar method can be used for e.g. Internet bank login, or other kinds of secure login or secure authentication. Instead of requesting a transaction identity from the transaction server a predefined identity is utilized, known by both the first transaction part and the transaction server, such as a social security number, account number or similar. The user of the first transaction part preferably enters this predefined identity at the second transaction part and thereby initiates the login at the second transaction part. Alternatively the first and second transaction parts are e.g. equipped with electronic communication means, providing the possibility for the first transaction part to enter the predefined identity at the second transaction part without the user needing to perform it manually. The user of the first transaction part also selects a "secure login" section of the user transaction software to connect the portable radio communication device to the transaction server and thereby puts the first transaction part in an active transaction state on the transaction server.

After receiving the predefined identity at the second transaction part the second transaction part puts itself in an active transaction state on the transaction server and requests a verification connected to the login of the transaction server, based on the predefined identity. The transaction server checks that the portable radio communication device corresponding to the predefined identity is connected to the transaction server, at least by checking that the first transaction part is in an active transaction state on the transaction server. The transaction server preferably additionally requests a verification connected to the login from the first transaction part, or alternatively checks that the portable radio communication device of the first transaction part is on, which is performed without any active action by the user thereof.

The verification in the portable radio communication device is e.g. a PIN. The transaction server will when both transaction part are in the active state, or after verification when used, send a verification to the second transaction part confirming that the portable radio communication device has been verified, which will allow log in of the first transaction part into the second transaction part. In this case no PIN of other password has been transferred via the Internet connection. Further, the PIN has not been transferred between the transaction server and the second transaction part. The second part is only receives a confirmation that the identification is verified. Transactions at the second transaction part can hereafter be performed as previously described.

Examples of different transaction are e.g. point of sales (POS) transaction, person to person (P2P) transfer, micro payments, person to machine (vending machine) transaction, secure identification, electronic identification, secure authentication, etc.

It will be obvious that the present invention may be varied in a plurality of ways. Such variations are not to be regarded as departure from the scope of the present invention as defined by the appended claims. All such variations as would be obvious for a person skilled in the art are intended to be included within the scope of the present invention as defined by the appended claims.

The invention claimed is:

1. A system for secure transactions comprising:
   a portable radio communication device of a first transaction party, in which portable radio communication device a user transaction software has been installed in a secure way, wherein a user is identified in a secure way and tied to the installation; and
   a predefined transaction server, with which the user transaction software is arranged to communicate when secure transactions are performed;
   wherein the predefined transaction server is arranged to:
      put a first transaction party in an active transaction state on the predefined transaction server when the first transaction party activates itself through an encrypted wireless communication from the portable radio communication device to the predefined transaction server;
      put the first transaction party in a non-active transaction state on the predefined transaction server only at the occurrence of one of the following:
         the first transaction party requesting a non-active transaction state;
         a time-out of a transaction; or
         a finalization of a transaction;
      put a second transaction party in an active transaction state on the predefined transaction server when the second transaction party activates itself on the predefined transaction server;
      receive transaction information for a transaction, including a transaction identity, from the second transaction party;
      identify the first transaction party in the transaction using the transaction identity; and
      finalize the transaction if both transaction parties have an active transaction state on the predefined transaction server.

2. The system according to claim 1, wherein the predefined transaction server is arranged to create the transaction identity upon request from said first transaction party, and send the transaction identity to the first transaction party.

3. The system according to claim 1, wherein the predefined transaction server is arranged to:
   send the transaction information through an encrypted wireless communication to the first transaction party; and
   receive a verification through an encrypted wireless communication from the first transaction party.

* * * * *